(12) United States Patent
Ramaswamy et al.

(10) Patent No.: US 8,665,712 B2
(45) Date of Patent: Mar. 4, 2014

(54) APPARATUS AND METHODS FOR DELAYED NETWORK INFORMATION TRANSFER

(75) Inventors: Kumar Ramaswamy, Princeton, NJ (US); Jun Li, Plainsboro, NJ (US)

(73) Assignee: Thomson Licensing, Boulogne-Billcourt (FR)

( * ) Notice: Subject to any disclaimer, the term of this patent is extended or adjusted under 35 U.S.C. 154(b) by 0 days.

(21) Appl. No.: 10/498,402

(22) PCT Filed: Dec. 6, 2002

(86) PCT No.: PCT/US02/38876
§ 371 (c)(1),
(2), (4) Date: Jun. 10, 2004

(87) PCT Pub. No.: WO03/052608
PCT Pub. Date: Jun. 26, 2003

(65) Prior Publication Data
US 2005/0018695 A1    Jan. 27, 2005

Related U.S. Application Data

(60) Provisional application No. 60/340,549, filed on Dec. 13, 2001.

(51) Int. Cl.
*H04L 12/00* (2006.01)
*G06F 13/14* (2006.01)
*G06F 15/16* (2006.01)

(52) U.S. Cl.
USPC ........... 370/229; 370/230; 370/235; 370/236; 370/252; 709/219; 709/223; 709/238; 709/240

(58) Field of Classification Search
USPC .............................................. 370/400, 395.1
See application file for complete search history.

(56) References Cited

U.S. PATENT DOCUMENTS

| 4,642,758 | A | | 2/1987 | Teng |
| 5,592,626 | A | | 1/1997 | Papadimitriou et al. |
| 5,812,930 | A | * | 9/1998 | Zavrel ............... 725/62 |
| 5,881,231 | A | | 3/1999 | Takagi et al. |
| 5,999,526 | A | * | 12/1999 | Garland et al. ............. 370/352 |
| 6,003,082 | A | * | 12/1999 | Gampper et al. ............. 709/225 |
| 6,134,584 | A | * | 10/2000 | Chang et al. ................. 709/219 |
| 6,889,257 | B1 | * | 5/2005 | Patel ............................ 709/232 |

(Continued)

FOREIGN PATENT DOCUMENTS

| CN | 1243389 A | 2/2000 |
| JP | 2001-156919 | 6/2001 |
| WO | WO 01/73569 | 3/2001 |

OTHER PUBLICATIONS

Search Report Dated Mar. 7, 2003.

*Primary Examiner* — Hanh N Nguyen
*Assistant Examiner* — Joshua A Kading
(74) *Attorney, Agent, or Firm* — Robert D. Shedd

(57) ABSTRACT

Apparatus and method for delayed network information transfer are disclosed. A user requests a file via a file requesting device, over a network, from a server. That request is accompanied by an expected delivery time of the file to the user. A schedule is generated by the server for transfer of the file according to a scheduled time, which scheduled time is determined in part at least by the expected delivery time. At the scheduled time, the file is then transmitted by the server to a file receiving device.

25 Claims, 2 Drawing Sheets

(56) References Cited

U.S. PATENT DOCUMENTS

| | | | | |
|---|---|---|---|---|
| 6,961,341 | B1* | 11/2005 | Krishnan | 370/412 |
| 7,065,586 | B2* | 6/2006 | Ruttenberg et al. | 709/244 |
| 7,457,851 | B2* | 11/2008 | Ramaswamy et al. | 709/219 |
| 7,899,886 | B2* | 3/2011 | Ramaswamy et al. | 709/219 |
| 2001/0034230 | A1* | 10/2001 | Okada et al. | 455/428 |
| 2002/0049608 | A1* | 4/2002 | Hartsell et al. | 705/1 |
| 2002/0198953 | A1* | 12/2002 | O'Rourke et al. | 709/213 |
| 2003/0050050 | A1 | 3/2003 | Higuchi et al. | |
| 2005/0273514 | A1* | 12/2005 | Milkey et al. | 709/232 |

* cited by examiner

APPARATUS AND METHODS FOR DELAYED NETWORK INFORMATION TRANSFER

This application claims the benefit, under 35 U.S.C. §365 of International Application PCT/US02/38876, filed Dec. 6, 2002, which was published in accordance with PCT Article 21(2) on Jun. 26, 2003 in English and which claims the benefit of U.S. Provisional patent application No. 60/340,549, filed Dec. 13, 2001.

FIELD OF THE INVENTION

The present invention relates to information transfer in communication networks. More specifically, the present invention relates to the delayed transfer of information through communication networks.

BACKGROUND OF THE INVENTION

Communication networks have a range of bandwidths. A low bandwidth network generally provides slower transfer of the same amount of digital information as compared to a high bandwidth network. The comparatively slow transfer rate of low bandwidth networks may create difficulties when transferring large amounts of digital information.

One type of digital information increasingly transferred over networks is multimedia digital information. Multimedia digital information, e.g. audio, video, etc., generally favors high bandwidth networks for its transmission, as multimedia digital information files are generally large. Transferring those large multimedia files over low bandwidth networks may be impractical. Additionally, since communication networks are subject to dropouts and other errors, transferring multimedia files over a slower connection, that is, when there is a greater time for errors to occur during the transfer, may be impossible.

Low bandwidth networks, however, are often more convenient than high bandwidth networks. Thus, the user may use the low bandwidth networks more, and be more familiar with those networks, thus leading to difficulties for the multimedia digital information provider. On the one hand, the potential audience for the multimedia provider's content may be greater in the low bandwidth network space, yet on the other hand, the provider may simply be unable to reach that audience with the content because of the difficulties in transmitting multimedia content over a low bandwidth network.

One type of digital information increasingly transferred over networks is multimedia digital information. Multimedia digital information, e.g. audio, video, etc., generally favors high bandwidth networks for its transmission, as multimedia digital information files are generally large. Transferring those large multimedia files over low bandwidth networks may be impractical. Additionally, since communication networks are subject to dropouts and other errors, transferring multimedia files over a slower connection, that is, when there is a greater time for errors to occur during the transfer, may be impossible.

Accordingly, there exists a need for apparatus and methods for transferring digital information to users so that network status, user status and server status are taken into account.

SUMMARY OF THE INVENTION

The present invention comprises apparatus and methods for transferring digital information to users so that network status, user status and server status are taken into account. A user requests a file via a file requesting device, over a network, from a server. That request is accompanied by an expected delivery time of the file to the user. The file is scheduled by the server for transfer according to a scheduled time, which scheduled time is determined in part at least by the expected delivery time. At the scheduled time, the file is then transmitted from the server to a file receiving device.

Additional advantages and novel features of the invention will be set forth in part in the description and figures which follow, and in part will become apparent to those skilled in the art on examination of the following, or may be learned by practice of the invention.

DETAILED DESCRIPTION OF THE EMBODIMENTS

Figure 1:
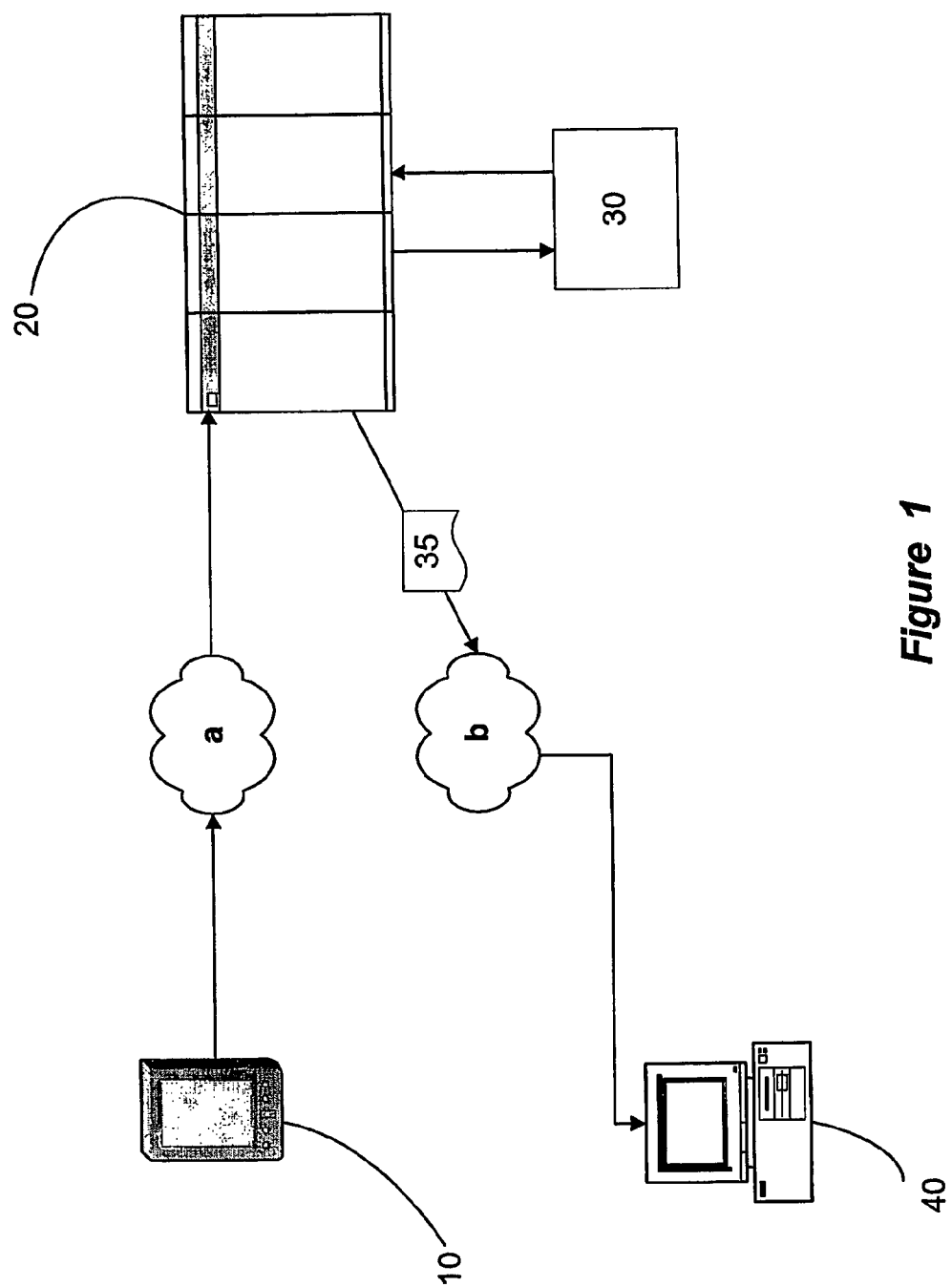
FIG. 1 shows a preferred embodiment.

FIG. 1 shows a preferred embodiment of the present invention. File requesting device 10 has a network connection a to a server 20. A file requesting device may be in this embodiment, a personal digital assistant (PDA) form factor having wireless network capabilities and an operating system (OS) (which may be a OS as is known in the art, e.g. Palm OS, Windows CE, Pocket PC, Linux, etc.)

The user chooses code, data, information and/or files (referred to generally herein as a "file") on the server 20, over the network a, and provides an expected delivery time. The server 20 generates a schedule 30 for the download based on a number of variables, including server status, status of the network, user-provided expected delivery time, etc. Note that, in some instances conditions may warrant download of the requested file to the user before the expected delivery time, assuming the user is available, such as when server and network conditions are favorable for that download. Yet, this type of download may be before the user is ready for the download. Thus, in some embodiments, the user may specify a "not sooner than" time for delivery as well as an expected delivery time. The server 20 then transmits the file 35 according to its generated schedule 30, to a user's file receiving device 40, over a network b.

Figure 2:
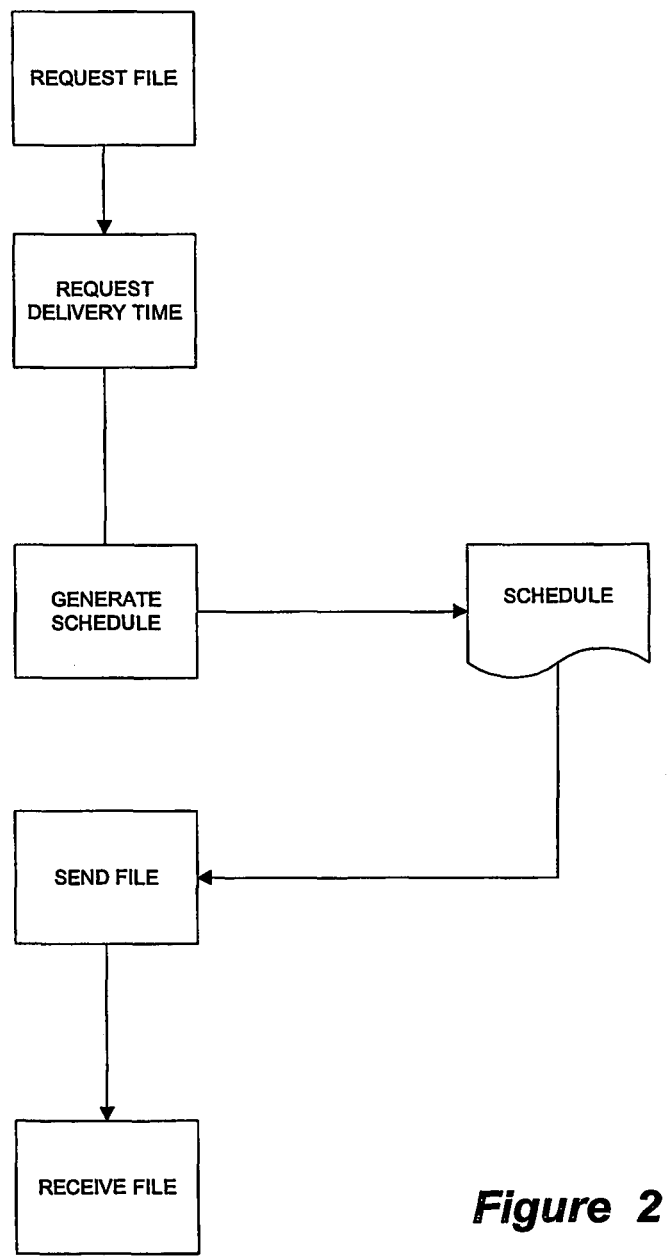
FIG. 2 is a flow chart of a process of a preferred embodiment.

FIG. 2 shows the process of a preferred embodiment. The user requests a file via a file requesting device from the server and requests a delivery time for the file. The server processes the request and generates a schedule for delivery of the file. The server then uses the schedule to transmit the requested file to the user, who receives the file with his or her file receiving device.

In examples of the embodiments, status of a user's system (also referred to herein as a "client,") server, and network are taken into account. For example, the user may begin the process of an embodiment by requesting a file over a PC, (first client condition) over a DSL network (first network condition) from a private video server (first server condition), to be delivered within 10 minutes. Delivery then comprises the PC (second client condition) receiving the file over the same network (second network condition) from the video server (second server condition) at the scheduled time. The difference between the conditions, in this embodiment, is that the scheduled time has established the new client/network/server conditions.

Thus, providing the client with a delayed download alternative according to embodiments of the present invention takes into account a number of variables: the client status, for example a user may not be prepared to receive a file immediately, etc.; as well as the network status, e.g., the network may be too congested to transmit a download, etc.; as well as the server status, e.g. the server may schedule a delivery to avoid busy times.

Thus, the process of the preferred embodiments comprises, in the requesting stage; a first client status or condition using a file requesting device, a first network status or condition comprising the type of network used and its transmission status, and a first server status or condition e.g. a web server. The receiving stage comprises a second client status or condition, using a file receiving device, a second network status or condition, comprising the type of network used and its transmission status, and a second server status or condition, e.g. a cache server. The various receiving conditions (client/network/server) are set at least in part, by the user provided expected delivery time. So for example, a cellphone (first client condition) may request a file over a cellular network (first network condition) from a Web server (server condition), to be delivered two hours later. Delivery then comprises a PVR (second client condition) receiving the file over a cable network (second network condition) from a cached video server. Insofar as embodiments may use a cached server to download the files, use of those cached servers may be in the manners disclosed in co-pending U.S. application No. 60/340,551, entitled APPARATUS AND METHODS FOR INFORMATION TRANSFER USING A CACHED SERVER, filed 13 Dec. 2001.

It should be noted that the initial file request may be made through various types of communication devices, e.g. cell phone, notebook computer, personal computer, etc. (herein referred to as a "file requesting device.") In some preferred embodiments, the initial request may be made via a low bandwidth network, however, a high bandwidth network may also be used.

Moreover, various types of devices may receive the requested file, (e.g., PDA, cell phone, notebook computer, desktop computer, personal video recorder, etc., herein referred to as a "file receiving device.") It should also be noted that, in certain embodiments, the user may use a device as both a file requesting device and a file receiving device.

The server, in this and other embodiments may be implemented in Unix® and Unix®-like platforms, including but not limited to Linux® and its variants, as well as other operating system platforms including but not limited to Microsoft Windows® XP, NT, Windows® 2000, Windows®95, 98 and Me, IBM OS/390, MacOS, VxWorks® and others.

It should be noted that embodiments may be implemented through distributed services as well. For example, a server may be a web server only, with a listing of files, accessible to the user, that is actually stored on one or more other servers. Those one or more servers in turn, would be responsible for transferring the file. Thus, one or more systems and/or servers may be used in various embodiments.

Users may be assigned access and/or download rights depending upon their status with the file provider. Those with a preferred status may have different download rights, a different possible schedule of download rights, etc. than other users. Users may also be provided with a content redirection device, in the manners disclosed in co-pending U.S. application No. 60/340,547, entitled APPARATUS, METHODS AND ARTICLES OF MANUFACTURE FOR WIRELESS COMMUNICATION NETWORKS, filed 13 Dec. 2001.

The schedule for download may be static in various embodiments, such as when only the user provided expected delivery time is considered, or dynamic, such as when user provided expected delivery time, server status, cache server status, network status, cost of transfer over a network, etc. are considered as well. For example, if connection is through a network, and the network has a relatively small load, than the transfer may occur. If the network is presently loaded near capacity, then file transfer may be delayed until more favorable conditions are present. The server may also delay transfer for a lower priority user. The type of file may also determine, in part, transfer time. An especially newsworthy file may, for example, be transferred more quickly than an entertainment file.

Various types of transmission may be used for the transfer. For example, unicasting, broadcasting or multicasting may be used, with the selection of the latter two possibly depending upon similar scheduling supplied by more than one user with similar user-provided expected delivery times. Usually broadcasting and/or multicasting will result in improved speed for content delivery.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

The invention claimed is:

1. A method for transferring information comprising the steps of:
   receiving a request for a file, via a server, over a first network, from a file requesting device;
   receiving a user expected delivery time and a "not sooner than" time for delivery for said file, via said server, from said file requesting device;
   generating a schedule, via said server, with said schedule further comprising a transfer time for said file and using said user expected delivery time and availability of a file receiving device, the transfer time in the schedule generated via said server takes into account access rights, user status with the file provider, and priority of the file requesting device, type of file being transferred and server-determined factors identifying conditions of at least two of the file requesting device, the network, the server and the file receiving device;
   determining, by the server, if any factors used for generating the schedule will delay the transfer time of the file, said factors comprising an amount of network congestion;
   modifying the transfer time of the file by taking into account the server-determined factors in response to determining file transfer will be delayed;
   transmitting said file, at the scheduled time in response to determining file transfer will not be delayed, from said server to said file receiving device, over a second network different from said first network, wherein said file requesting device is a self-contained unit and is separate from said file receiving device; and
   transmitting said file, at the modified transfer time in response to determining file transfer will be delayed, from said server to the file receiving device.

2. A method for transferring information as in claim 1, wherein said first network has a lower data transmission capability than said second network.

3. A method for transferring information as in claim 1, wherein said first network is a wireless network.

4. A method for transferring information as in claim 1, wherein said file requesting device is selected from the group consisting of personal digital assistant, cell phone, notebook computer and personal computer.

5. A method for transferring information as in claim 1, wherein said file receiving device is selected from the group consisting of personal digital assistant, cell phone, notebook computer and personal computer.

6. A method for transferring information as in claim 1, wherein said first network is a wireless network and said second network has a higher data transmission capability than said first network.

7. A method for transferring information as in claim 1, wherein said first network is a cellular network and said second network is a cable network.

8. A system for transferring information comprising:
a file requesting device as a self-contained unit;
a server; and,
a file receiving device separate from said file requesting device;
wherein when a request for a file is made by said file requesting device over a first network to said server, said request is accompanied by a user expected delivery time and a "not sooner than" time for delivery, and said server transfers said file to said file receiving device over a second network, different from said first network, at a scheduled time determined by said user expected delivery time and availability of a file receiving device, the scheduled time takes into account access rights, user status with the file provider and priority of the file requesting device, type of file being transferred and server-determined factors identifying conditions of at least two of the file requesting device, the network, the server and the file receiving device,
wherein said server determines if any factors used in generating the schedule, said factors comprising an amount of network congestion, will delay the transfer at the scheduled time and modifies the transfer time of the file by taking into account the server-determined factors in response to determining file transfer will be delayed and transmits the file to the file receiving device at the modified transfer time in response to determining the file transfer will be delayed.

9. A system for transferring information as in claim 8, wherein said first network has a lower data transmission capability than said second network.

10. A system for transferring information as in claim 8, wherein said first network is a wireless network.

11. A system for transferring information as in claim 8, wherein said file requesting device is selected from the group consisting of personal digital assistant, cell phone, notebook computer and personal computer.

12. A system for transferring information as in claim 8, wherein said file receiving device is selected from the group consisting of personal digital assistant, cell phone, notebook computer and personal computer.

13. A system for transferring information as in claim 8, wherein said file requesting device is selected from the group consisting of personal digital assistant, cell phone, notebook computer and personal computer.

14. A system for transferring information as in claim 8, wherein said file receiving device is selected from the group consisting of personal digital assistant, cell phone, notebook computer and personal computer.

15. A system for transferring information as in claim 8, wherein said first network is a wireless network and said second network has a higher data transmission capability than said first network.

16. A system for transferring information as in claim 8, wherein said first network is a cellular network and said second network is a cable network.

17. A system for transferring information comprising:
a first client condition;
a first network condition;
a first server condition;
a second client condition;
a second network condition; and,
a second server condition;
wherein a file requesting device in said first client condition, transmits a request for a file via a first network in said first network condition, with said request for said file comprising a user expected delivery time and a "not sooner than" time for delivery, to a server in said first server condition, and, upon receipt of said request for said file, said server generates a schedule for transmission of said file and uses said user expected delivery time and availability of a file receiving device and access rights, user status with the file provider, and priority of the file requesting device, type of file being transferred and transmits said file according to said schedule, which places said server in said second server condition, with the transmission sent via a second network, different from said first network, in said second network condition, and with said file received by said file receiving device, different from said file requesting device, in said second client condition, wherein said file requesting device is a self-contained unit; and
wherein said server determines if said conditions, said conditions comprising an amount of network congestion, will delay the scheduled transfer of said file and modifies a transfer time of the file by taking into account said conditions in response to determining said conditions will delay the scheduled transfer by scheduling a delayed file delivery time and transmits said file at said delayed delivery time.

18. A system for transferring information as in claim 17, wherein said first network has a lower data transmission capability than said second network.

19. A system for transferring information as in claim 17, wherein said first network is a wireless network.

20. A system for transferring information as in claim 17, wherein said first network is a wireless network and said second network has a higher data transmission capability than said first network.

21. A system for transferring information as in claim 17, wherein said first network is a cellular network and said second network is a cable network.

22. A method for operating a file server, comprising the steps of:
receiving data from a file requesting device over a first network regarding a user expected delivery time and a "not sooner than" time for delivery for a requested file and regarding availability of a file receiving device separate from said file requesting device;
generating a time schedule for transferring said file responsive to said receiving step;
implementing said generating step responsive to account access rights and user status with the file provider, to said file, any priority status of said file requesting device and a type of said file;
determining at least two server-related factors, said factors comprising an amount of network congestion, among conditions of the file requesting device, the network, the file server and the file receiving device; and, transmitting said requested file at the scheduled time from said file server to said file receiving device over a second network different from said first network.

23. The method of claim 22, wherein said receiving step is implemented wirelessly.

24. The method of claim 22, wherein said implementing step is implemented in a Video On Demand server.

25. The method of claim 22, wherein said data in said receiving step comprises availability of said file requesting device.

* * * * *